(12) United States Patent
Zimmerman et al.

(10) Patent No.: US 6,542,717 B1
(45) Date of Patent: Apr. 1, 2003

(54) SYSTEM AND METHOD FOR OPTIMIZING PERSONAL AREA NETWORK (PAN) ELECTROSTATIC COMMUNICATION

(75) Inventors: Thomas Guthrie Zimmerman, Cupertino, CA (US); Richard Clement Allen, Los Gatos, CA (US); David Jun Lu, San Jose, CA (US); Florian Vogt, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 09/234,229

(22) Filed: Jan. 20, 1999

(51) Int. Cl.7 .................................................. H04B 5/00
(52) U.S. Cl. .......................... 455/41; 455/100; 455/272; 455/344
(58) Field of Search .................... 455/100, 41, 67.1, 455/67.4, 500, 272, 344; 340/573.1, 573.2, 573.3, 573.4, 407.1, 407.2; 343/718

(56) References Cited

U.S. PATENT DOCUMENTS

| | | | | |
|---|---|---|---|---|
| 4,734,034 A | * | 3/1988 | Maness et al. | 433/68 |
| 5,436,613 A | * | 7/1995 | Ghosh et al. | 340/573 |
| 5,796,827 A | * | 8/1998 | Coppersmith et al. | 380/9 |
| 5,914,701 A | * | 6/1999 | Gersheneld et al. | 345/156 |
| 6,104,913 A | * | 8/2000 | McAllister | 455/41 |
| 6,181,284 B1 | * | 1/2001 | Madsen et al. | 343/702 |
| 6,223,018 B1 | * | 4/2001 | Fukumoto et al. | 455/4 |

FOREIGN PATENT DOCUMENTS

| | | | | |
|---|---|---|---|---|
| EP | 0843425 A2 | 9/1997 | ............ | H04B/13/00 |
| GB | 2294609 A | 10/1994 | ............ | H04B/7/08 |
| JP | 010072628 A | 3/1989 | ............ | H04B/7/08 |
| WO | WO96/36134 A1 | 5/1995 | ............ | H04B/5/00 |

OTHER PUBLICATIONS

Publication: "Applying Electric Field Sensing to Human–Computer Interfaces." pp. 1–11. Proceedings Papers. ACM. MIT Media Laboratory, Cambridge, Mass. 1995.

* cited by examiner

Primary Examiner—Dwayne Bost
Assistant Examiner—Lewis West
(74) Attorney, Agent, or Firm—John L. Rogitz

(57) ABSTRACT

Systems and methods for optimizing performance of personal area network (PAN) systems that use electric fields as communication media between PAN transmitters carried by people and PAN receivers mounted on computers to which selective access is sought to be established. Multiple PAN receiver antennae are mounted on a keyboard, such that if a person with a PAN transmitter rests her arms on or near the keyboard, sufficient signal from the transmitter is sensed by one or more of the receiver antennae even though some of the signal is shunted away from the receivers through the arms. Also, a driven shield insulates a PAN receiver from nearby metal objects, e.g., a desk on which the PAN receiver is supported. Moreover, a multiple-electrode PAN transmitter reduces the deleterious effects on the signal from the PAN transmitter that can otherwise be caused by, e.g., loose metal coins that are present in a pocket in which the transmitter is carried. Further, differential receive electrodes prevents undesirable coupling of a PAN transmitted signal to a computer's receiver through a person who has positioned herself between the receiver and the person carrying the PAN transmitter to, for example, gain unauthorized access to the computer.

51 Claims, 4 Drawing Sheets

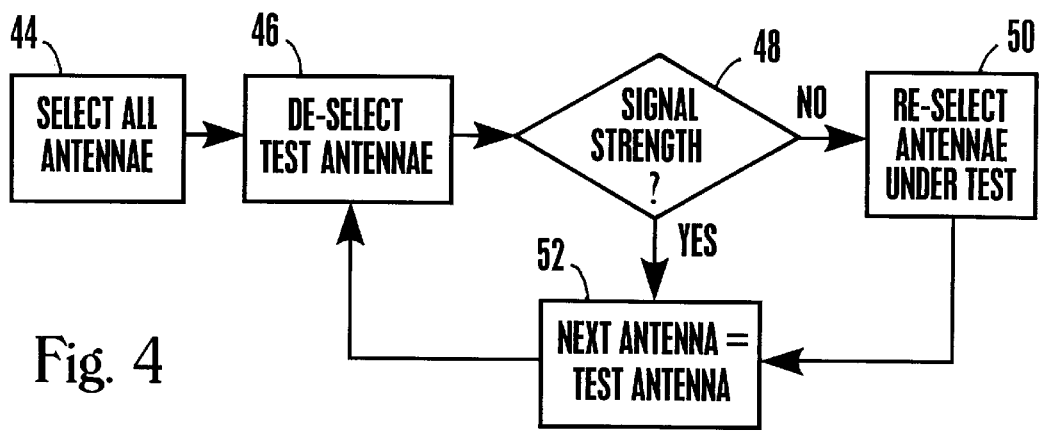
Fig. 4
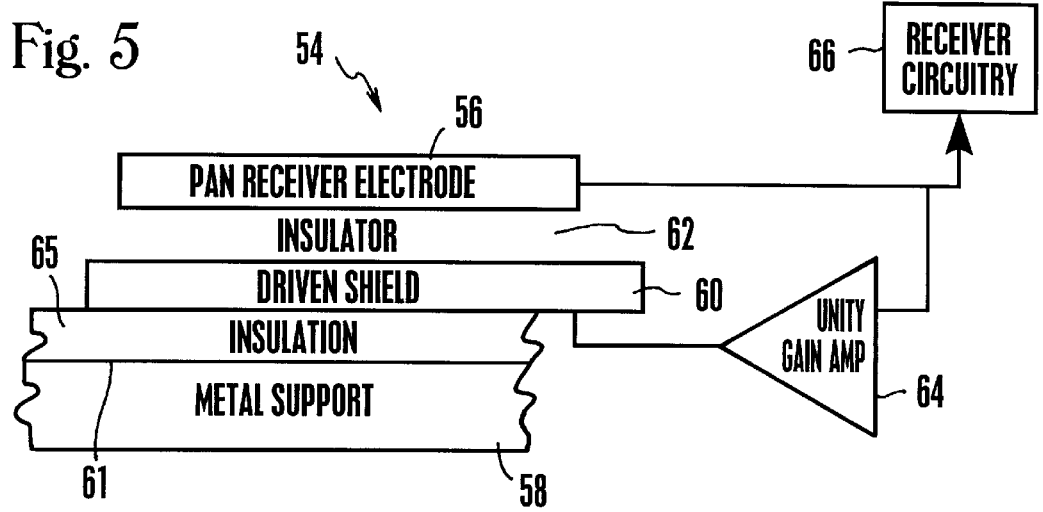
Fig. 5
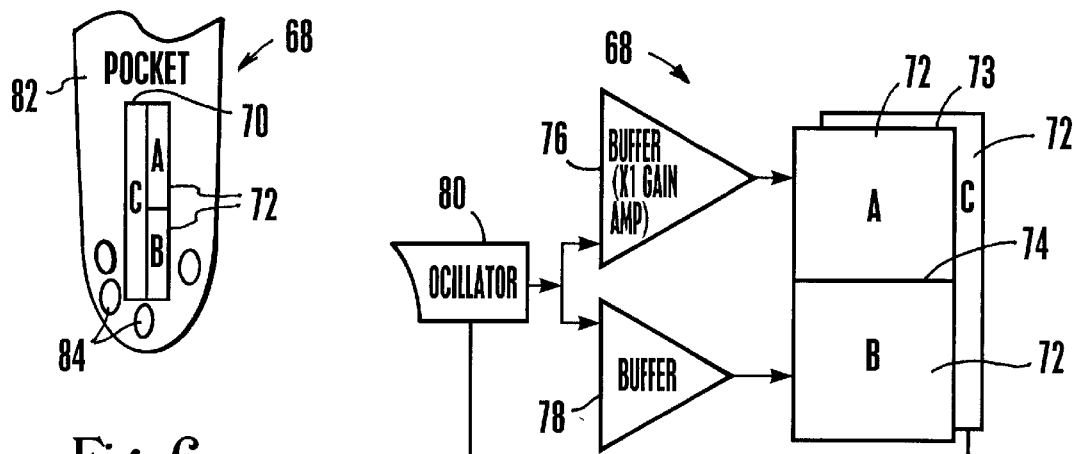
Fig. 6
Fig. 7

SYSTEM AND METHOD FOR OPTIMIZING PERSONAL AREA NETWORK (PAN) ELECTROSTATIC COMMUNICATION

BACKGROUND OF THE INVENTION

1. Field of the Invention

The present invention relates generally to computer communications, and more particularly to methods and systems for providing effective short-range communication using electric fields.

2. Description of the Related Art

The concept of using a personal area network (PAN) as a medium for short range communication using a person's interaction with an electric field is discussed in U.S. Pat. No. 5,796,827, entitled System and Method for Near-Field Human-Body Coupling for Encrypted Communication with Identification Cards, owned by the same assignee as is the present invention and incorporated herein by reference. As disclosed in the above-mentioned patent, using the principles of PAN a small, lightweight transmitter is incorporated in a personal security card that is about the size of a credit card and that can be worn or otherwise carried by a person. The PAN transmitter automatically communicates information (for example, the person's identity, personal identification number (PIN), social security number, security clearance, and so on) to a PAN receiver via an electric field with which the person interacts. According to PAN principles, the receiver is associated with a computer that is positioned nearby the location of the person, such that the PAN transmitter communicates with the computer.

Owing to the principles underlying PAN communications, the PAN receivers are low power, low latency, low cost receivers that can be easily disposed on, e.g., a computer, computer mouse, keyboard, or security reader in a room. The receivers sense signals that are sent by the transmitter and that are coupled through the person's body. As mentioned above, these signals carry information, such as authenticating information indicating that the bearer of the transmitter is authorized to use a particular computer or enter a particular area, or that the bearer of the transmitter was present in a particular room at a particular time.

With the above in mind, it will be appreciated that many potential applications for PAN communication exist. Among the myriad applications of PAN communication systems is ensuring that only a person carrying a valid PAN transmitter can log on to a particular computer or computer system. Further applications include authenticating a person who desires to enter a restricted access area, or otherwise monitor the movement of people in a building, so that their whereabouts are known. Still further, PAN communication can be used to grant selective access to automatic teller machines (ATMs). All of the above applications, owing to the nature of PAN communication, require a person to do nothing other than bear a valid PAN transmitter. Thus, PAN communication systems are efficient and convenient solutions for a wide range of personal authentication nuisances.

As recognized by the present invention, while PAN systems are proven, highly effective communication systems, it happens that in certain applications PAN system performance can be further optimized. For example, when a person carrying a valid PAN transmitter wishes to access a computer having a PAN receiver mounted in the keyboard of the computer, the transmitted signal can be undesirably significantly attenuated when the user places his hands or arms on the keyboard. Still further, the present invention recognizes that undesirable coupling and shunting can occur between PAN receivers and a metal surface on which the receivers are supported. Moreover, the present invention recognizes that the signal strength from a PAN transmitter can be undesirably affected when the transmitter is carried in, for example, a person's pocket along with other metal objects such as metal coins. And, the present invention recognizes that unauthorized third persons might position themselves between a person carrying a valid PAN transmitter and a receiver to undesirably gain access to a computer or room that is associated with the PAN receiver. For example, the present invention recognizes that a signal from a PAN transmitter might be coupled to a PAN receiver of an ATM machine or a computer-controlled subway turnstile through a person who has interposed herself between a valid PAN transmitter and the receiver, thereby affording the person unauthorized access to the ATM machine or turnstile.

Fortunately, the present invention recognizes that it is possible to overcome the above-noted problems efficiently and effectively.

SUMMARY OF THE INVENTION

A personal area network (PAN) communication system includes a portable PAN transmitter, a computer, and more than one PAN receiver antenna associated with the computer such that communication can be established between the PAN transmitter and the computer. In accordance with PAN principles, communication between the transmitter and computer is established using an electric field.

In a preferred embodiment, a data input device such as a keyboard communicates with the computer, and the receiver antennae are mounted on the data input device. The system includes at least three, and preferably four, receiver antennae. At least one of the receiver antennae extends substantially from the left side to the right side of the keyboard.

As disclosed in detail below, the receiver antennae are associated with a receiver and the receiver is associated with a signal. With this in mind, the preferred system further includes logic means for selecting one or a combination of multiple antennas to produce a maximum received signal. In this way, an optimum combination of the receiver antennae is established by decoupling those antennae that might be shielded from, or otherwise attenuated from, the transmitter by, e.g., the person's arms.

In another aspect, a PAN communication system is disclosed that communicates information via an electric field from a PAN transmitter to a PAN receiver. The PAN receiver includes at least one receive electrode disposed above a driven shield. Furthermore, an insulator layer is sandwiched between the receive electrode and the driven shield. A buffer, such as a unity gain amplifier, is electrically connected to the driven shield and to the receiver. The driven shield, substantially electrically isolates the receive electrode from any or other grounding source in the vicinity of the receive electrode, increasing the impedance and lowering the capacitance of the receive electrode.

In still another aspect, in a PAN communication system, a PAN transmitter is disclosed. The transmitter includes plural transmitter electrodes. In a particularly preferred embodiment, the transmitter includes first and second driven electrodes, with each driven electrode being energized by a respective buffer circuit and with each buffer circuit being electrically connected to a signal source.

In yet another aspect, a PAN communication system includes at least one PAN receiver including differential receive electrodes and at least one portable PAN transmitter.

Per present principles, the receive electrodes are positioned to measure the electrical potential difference across a person, whereby a person carrying a PAN transmitter will produce a substantial measured potential across the receive electrodes, while a person who does not have a PAN card on their person will produce substantially no electric potential across the receive electrodes. This prevents communication from the PAN transmitter to the receiver via a person without a PAN card.

Preferably, when a receive electrode is placed near the ground or other electrical body which may shunt, conduct, or otherwise reduce the received signal, a guard electrode is juxtaposed with and insulated from the receive electrode. Additionally, a guard driving follower amplifier is electrically connected from the receive electrode to the guarded electrode, to electrically isolate the receive electrode from the ground or electrical body.

In another aspect, a communication system for communicating data between a portable transmitter and a computer system nearby the transmitter using an electric field affected by a person bearing the transmitter includes a receiver that in turn includes plural receiver antennae. The receiver antennae are associated with the computer system such that at least some electric field lines from the person are not shunted away from at least one of the receiver antennae when the person moves an arm toward the computer system.

In yet another aspect, a communication system includes a receive electrode disposed above a metal surface and a driven shield disposed between the receive electrode and the metal surface to shield the receive electrode from the metal surface.

In still another aspect, the communication system includes an electrostatic transmitter including multiple driven electrodes, electrically isolated from at least one reference electrode.

In another aspect, a communication system includes a computer, an electrostatic receiver associated with the computer, and at least one receive electrode electrically connected to the receiver. A portable electrostatic transmitter is bearable by a first person for communicating with the computer via the receiver. Per the present invention, means are provided for preventing communication between the transmitter and receiver when a second person not bearing an electrostatic transmitter is interposed between the transmitter and the receiver. In one embodiment, the means for preventing includes a detector for detecting a predetermined characteristic in the signal when a first person bearing the transmitter moves a limb toward the receive electrode. In a particularly preferred embodiment, the predetermined characteristic is at least one of: an amplitude minimum, and a change of phase.

The invention can also include a general purpose computer programmed according to the inventive steps herein to dynamically determine an optimum combination of PAN receive electrodes that are associated with a PAN receiver system. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 is a flow chart showing the logic steps used by the present invention to establish an optimum antenna combination for the system shown in FIG. 1;

FIG. 5 is a schematic diagram of a system for shielding a PAN receive electrode in, e.g., a computer keyboard, from a metal surface that keyboard might be supported on;

FIG. 6 is a schematic view of a multi-electrode PAN transmitter disposed in a pocket of a person adjacent loose change or other metal objects;

FIG. 7 is a schematic diagram of the electrical circuitry of the system shown in FIG. 6;

DETAILED DESCRIPTION OF THE PREFERRED EMBODIMENTS

Figure 1:
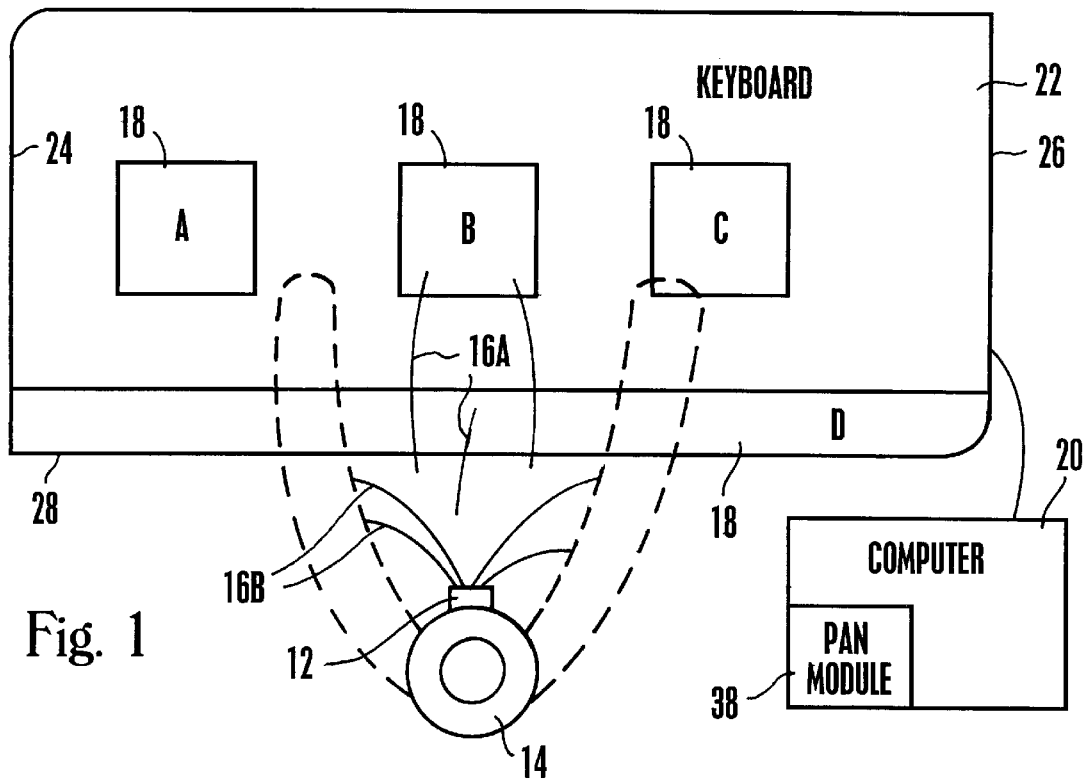
FIG. 1 is a schematic top plan view of a computer keyboard incorporating multiple PAN receiver antennae, with a user's arms shown in phantom to illustrate the shunting of the signal from the transmitter through the user's arms, and with the keys omitted for clarity.

Referring initially to FIG. 1, a communication system is shown, generally designated 10, which includes a portable, lightweight, personal area network (PAN) transmitter 12 that can be borne by a person 14 for communication of data via an electric field, represented by lines 16A and 16B, to one or more PAN receiver antennae 18A, 18B, 18C, 18D that are associated with a computer 20. Antennae are also referred to herein as "electrodes". In the particular embodiment shown, four receiver antennae 18 are mounted on an input device, and more particularly on a keyboard 22, that is electrically connected to the computer 20. It is to be understood that the receiver antennae 18 can be otherwise associated with the computer 20. For example, the receiver antennae 18 can be mounted on the computer 20 itself, or on a peripheral component thereof such as other input devices including mice, trackballs, keypads, joysticks, and voice activated input devices.

It is to be further understood that the computers of the present invention can be general purpose computers appropriate for their intended functions and programmed to undertake appropriate method steps set forth herein. For example, the computer 20 can be a desktop computer such as a personal computer or laptop computer made by International Business Machines Corporation (IBM) of Armonk, N.Y. Alternatively, the computers of the present invention may be any computer, including computers sold under trademarks such as AS400, with accompanying IBM Network Stations or, Unix computers, or OS/2 servers, or Windows NT servers, or IBM RS/6000 250 workstations, or other equivalent devices.

The above-referenced U.S. patent sets forth details about PAN communication systems; accordingly, for clarity and brevity of disclosure these details will not be repeated herein. By way of brief explanation, however, the PAN transmitter 12 can communicate data via the electrostatic field 16 to the PAN receiver antennae 18, and thence to the computer 20. This data might include, for example, the person's identity, personal identification number (PIN), computer user identification number, password, social security number, security clearance, access authentication data, and so on. The PAN transmitter may encrypt data to provide enhanced security, as described in U.S. Pat. No. 5,796,827. Thus, using PAN principles the person 14 need only wear or otherwise carry the PAN transmitter 12 and, when the person 14 is within a few meters of the computer 20, the PAN transmitter 12 automatically communicates the person's authentication data to the computer 20 to allow the person 14 to log on to the computer 20 without undue delay and without sacrificing security.

As recognized by the present invention, however, it is possible that as the person 14 extends the arms toward the keyboard 22, the person's body interacts with the electric field in such a way that some field lines 16B can undesirably be shunted away from the receiver antennae 18. Accordingly, the present invention provides plural receiver antennae 18 as shown, and more particularly the invention includes, from left to right looking down on the keyboard 22, left, center, and right generally co-linear antennae 18A, 18B, 18C, and a fourth elongated antenna 18D that extends substantially across the front of keyboard 22, from a left side 24 of the keyboard 22 to a right side 26 along a bottom edge 28 thereof. With this structure, at least some field lines 16A are not shunted away from all receiver antennae 18, but instead reach one or more of the receiver antennae 18 as shown.

Figure 2:
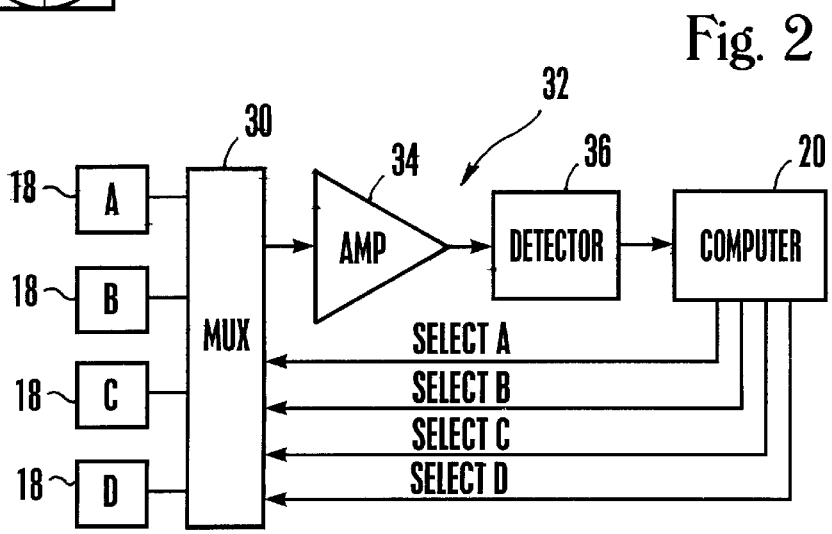
FIG. 2 is a schematic diagram of the electrical circuitry of the system shown in FIG. 1.

FIG. 2 shows further components of the communication system 10. As shown in FIG. 2, the antennae 18 are electrically connected to a multiplexer 30, and the multiplexer 30 in turn is electrically connected to a PAN receiver, generally designated 32. The PAN receiver 32 includes appropriate PAN receiver components including an amplifier 34 to which the multiplexer 30 is connected, with the amplified output of the amplifier 34 being sent to a detector 36. Digitized signals from the detector 36 are then sent to the computer 20. The computer 20 executes the logic shown in FIG. 4, and based on the results thereof selectively couples and decouples the antennae 18A–D from the receiver 32 by sending appropriate select and deselect signals to the multiplexer 30 via respective select lines A–D.

Figure 3:
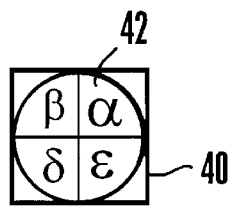
FIG. 3 is a schematic view of a computer program storage product.

More specifically, as intended by the present invention, to optimize communication signal strength between the transmitter 12 and the receiver that is associated with the receiver antennae 18, receiver antennae 18 that are shielded from field lines 16B by, e.g., the person's arms, are electrically decoupled from the receiver. In accordance with the present invention, to this end a PAN module 38 is incorporated into the computer 20 to undertake inventive method steps set forth below in reference to FIG. 4. It is to be understood that the control components such as the PAN module 38 are executed by logic components such as are embodied in logic circuits on, e.g., an application specific chip (ASIC) or in software contained in an appropriate electronic data storage, e.g., read only memory (ROM), random access memory (RAM), or hard disk drive and/or optical disk drive, or DASD array, magnetic tape, electronic read-only memory, or other appropriate data storage device that is conventionally coupled to the computer 20 for executing the module 38. For example, the control components can be embodied in a computer diskette 40 shown in FIG. 3. The diskette 40 shown in FIG. 3 has a computer usable medium 42 on which are stored computer readable code means (i.e., program code elements).

The flow charts herein illustrate the structure of the present logic. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. In other words, the PAN module 38 may be a computer program that is executed by a processor within the associated server computer 20 as a series of computer-executable instructions. In an illustrative embodiment of the invention, the computer-executable instructions may be lines of compiled $C^{++}$ compatible code, or assembly code running in a microcontroller.

FIG. 4 shows the logic for establishing an optimum combination of receiver antennae 18. Commencing at block 44, all receiver antennae 18 are initially selected, i.e., are initially coupled to the receiver 32. At block 46, a first one of the antennae 18, e.g., the left antenna 1 8A, is decoupled from the receiver 32 by sending the appropriate signal to the multiplexer 30 via the select line A. It is to be understood that if desired, the logic loop beginning at block 46 can be commenced only after the signal strength received by the receiver 32 decreases below a predetermined threshold.

Moving to decision diamond 48, it is determined whether the strength of a signal, e.g., the signal sensed by the receiver 32 or the signal output by the receiver 32, has increased as a result of the decoupling at block 46. Stated more broadly, at decision diamond 48 it is determined whether a signal increases or decreases as a result of the decoupling of the antenna 18 at block 46. If the signal does not exhibit the predetermined change (increase), the antenna decoupled at block 46 is recoupled to the receiver 32 at block 50 by sending an appropriate select signal to the multiplexer 30 along the select line A. The process then moves to block 52 to test the next antenna, e.g., the center antenna 18B, by looping back to block 46 and proceeding in accordance with the principles discussed above.

If, however, decoupling a receiver antenna 18 does result in an improved signal strength, the antenna is left decoupled, and the process moves from decision diamond 48 to block 52. Thus, it will be appreciated that the receiver antennae 18 are serially decoupled and tested, with the testing being perpetually repeated, if desired, as long as the person 14 operates the keyboard 22 to decouple and recouple antennae 18 as appropriate to optimize signal strength as the person 14 moves to interrupt the field lines 16.

FIG. 5 shows a receiver system for a PAN communication system, generally designated 54, that includes at least one PAN receive electrode 56 and a driven shield 60 separated from each other by an insulator 62. The electrical potential of the driven shield 60 is maintained substantially equal to the receive electrode 56 by a unity gain amp 64, minimizing the capacitive coupling of the receive electrode 56 to the environment, represented by a metal support 58 having a support surface 61. For example, the electrode 56 can be one or more of the antennae 18 shown in FIG. 1, and the metal support 58 can be a metal desk on which the keyboard 22 is disposed, that might otherwise decrease the signal detected by the system 54 by shunting electric field away from the receive electrode 56 and into the metal support 58. To minimize the power output required of the unity gain amp 64, the driven shield 60 is insulated from the support 58 by insulation 65. The output of the receiver electrode 56 is sent to receiver circuitry 66.

Moreover, the present invention recognizes that the driven shield 60 increases the antenna impedance and lowers the antenna capacitance of the system 54.

FIGS. 6 and 7 show a PAN system, generally designated 68, that includes a PAN transmitter 70. In turn, the PAN transmitter 70 includes plural plate-like transmitter electrodes 72A, 72B, 72C. More specifically, the PAN transmitter 70 includes at least first and second driven electrodes 72A, 72B, with the driven electrodes 72A, 72B being juxtaposed with a reference electrode 72C. As can be appreciated in reference to FIG. 7, the driven electrodes 72A, 72B are coplanar with each other and both are separated from the reference electrode 72C by an insulator 73 that is sandwiched between the reference electrode 72C and the driven electrodes 72A, 72B. In the geometry shown, the driven electrodes 72A, 72B are contiguous to each other along a common edge 74, it being understood that the electrodes 72A, 72B nonetheless are electrically insulated from each other by a narrow gap, with the driven electrodes 72A, 72B together being closely spaced from and parallel to the reference electrode 72C.

To render the electrodes 72A, 72B independently driven, respective first and second buffer circuits 76, 78 are electrically connected to the electrodes 72A, 72B. In one preferred embodiment, the buffer circuits 76, 78 include unity gain amplifiers. Also, signal generator 80 such as an oscillator is electrically connected to each buffer circuit 76, 78.

It may now be appreciated that the PAN transmitter 70 can be carried in, e.g., a person's pocket 82 (FIG. 6) that contains metal objects such as loose coins 84 that could undesirably shunt transmitted energy. Because two or more independently driven electrodes 72A, 72B are incorporated in the present invention, however, an electrode, such as the electrode 72B, from which energy is shunted by the coins 84 substantially does not affect the performance of the other electrode 72A.

Figure 8:
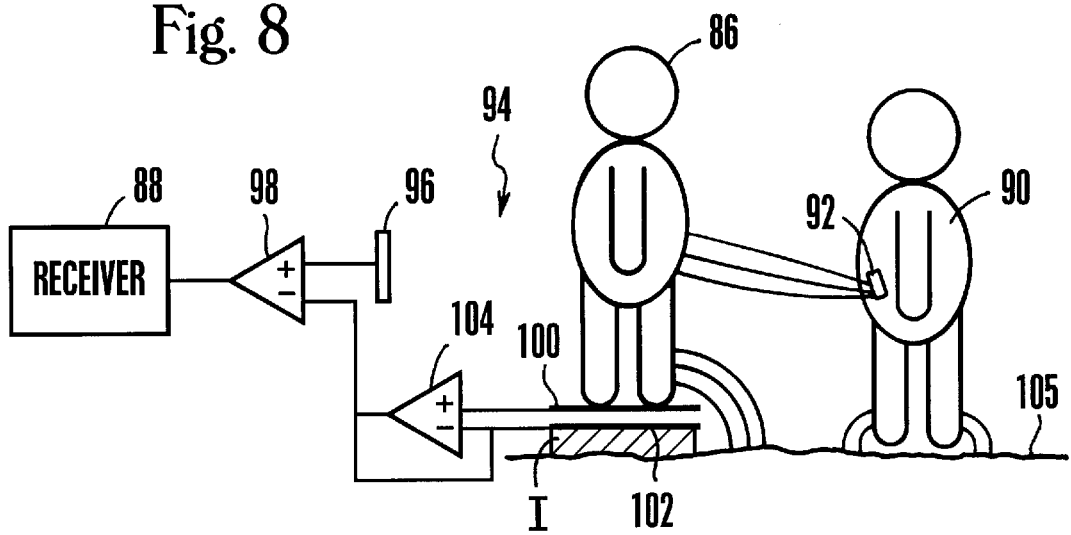
FIG. 8 is a schematic view of a PAN receiver system including a differential PAN receiver with a guard electrode functioning to prevent an unauthorized person from accessing a computer having a PAN receiver by positioning himself between the PAN receiver and a person with a valid PAN transmitter.
Figure 9:
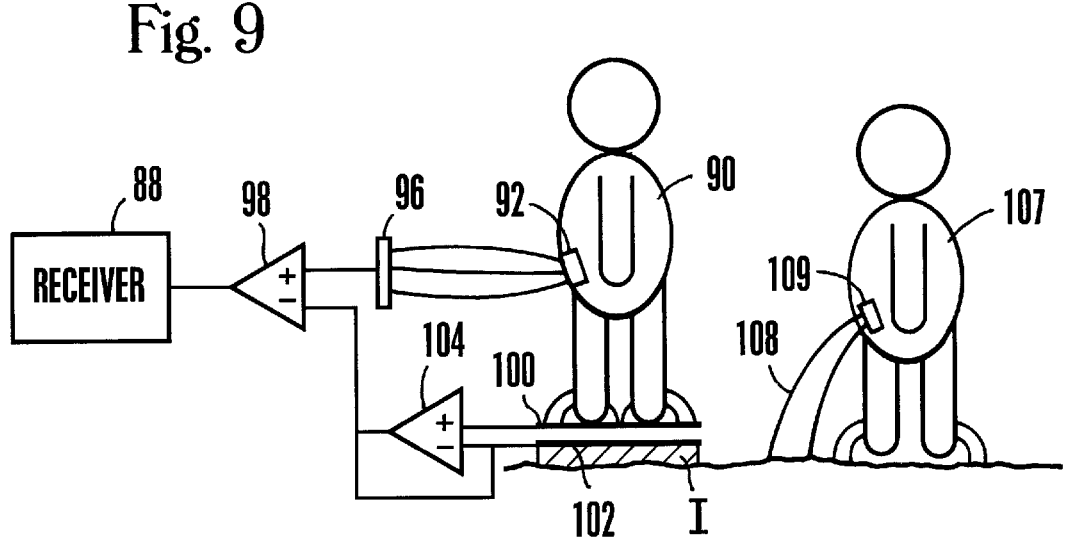
FIG. 9 is a schematic view of a PAN receiver system functioning to permit a person with a valid PAN transmitter to access a computer having a PAN receiver.

Now referring to FIGS. 8 and 9, the present PAN communication system, generally designated 94, is shown for preventing an unauthorized person 86 from gaining access to a PAN system computer (e.g., an ATM machine) by standing between a PAN receiver 88 and an authorized person 90 bearing a PAN transmitter 92. As shown, the communication system 94 includes at least one pair of PAN receive electrodes 96 and 100, configured as a differential receiver.

Additionally, when a receive electrode is placed near an electrical ground, as with receive electrode 100, the system 94 includes a guarded electrode 102 that is positioned underneath receive electrode 100 to isolate the receive electrode 100 from the environment/ground 105. For example, the receive electrode 100 and guarded electrode 102 can be embedded in a rubber mat on which a person can stand and thereby indirectly coupled to the receive electrode 100. Accordingly, the guarded electrode 102 preferably is insulated from ground 105 by insulation "I".

In accordance with the present invention, the receive electrodes 100 and 96 detect the potential difference across the person 86 standing near the receive electrodes 100 and 96. A unity gain follower 104 maintains the electrical potential of the guarded electrode 102 substantially equal to that of the receive electrode 100, isolating the receive electrode 100 from the ground 105. Also a differential amplifier 98 receives signals from the receive electrode 96 and the unity gain follower 104 as shown, amplifies the detected difference therebetween, and applies the differential signal to the receiver 88.

With this structure, when the unauthorized person 86 stands between the receive electrodes 96 and 100, the receive electrode 100 has substantially the same electric potential as the receive electrode 96, such that communication from the PAN transmitter 92 to the receiver 88 via the unauthorized person 86 is substantially prevented. On the other hand, when an authorized person 90 bearing a PAN transmitter 92 (FIG. 9) stands between receive electrodes 96 and 100, receive electrode 100 has a substantially different electric potential than the receive electrode 96. When this occurs, communication from the PAN transmitter 92 to the receiver 88 is permitted. A third person 107 who bears a PAN transmitter 109 but who is not standing between or otherwise interacting with receive electrodes 96 and 100, however, does not communicate with the receiver 88. This is because the electric field lines 108 from the transmitter 109 are shunted to ground, and consequently the third person 107 does not create a potential difference between the receive electrode 96 and the guarded electrode 100.

Figure 10A:
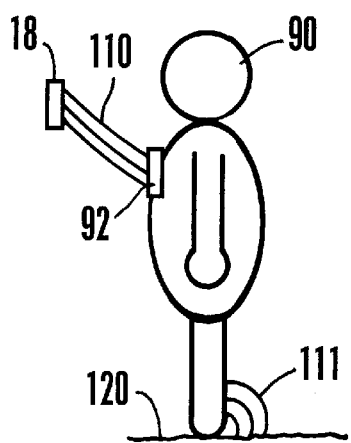
FIGS. 10A–10C are schematic views of three positions of a person with a valid PAN transmitter moving their hand towards a PAN receiver.
Figure 10B:
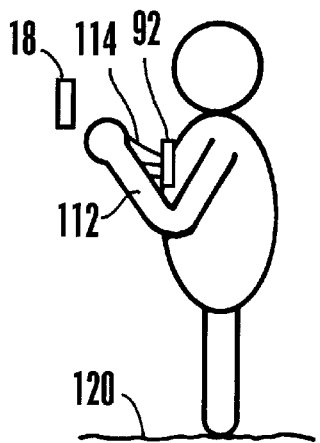
Figure 10C:
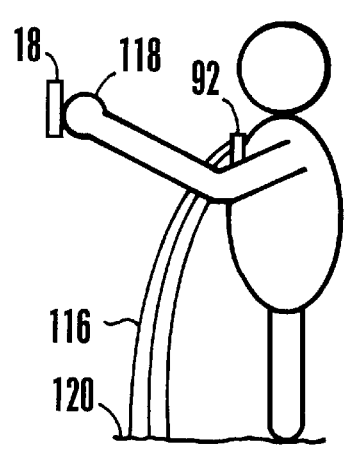
Figure 11:
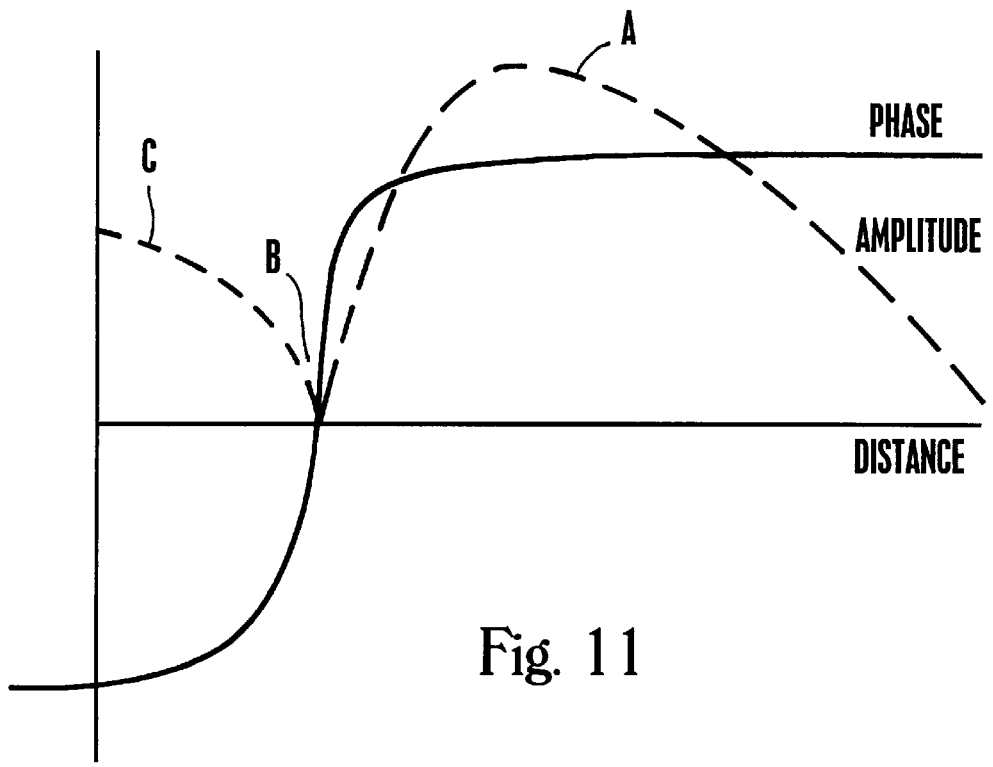
FIG. 11 is a graph showing the behavior of a PAN signal sensed by a PAN receiver as a person having a valid PAN transmitter lifts his arm toward the receiver, showing in dashed line the signal amplitude as a function of distance of the hand from the receiver, and showing in solid line the signal phase as a function of distance of the hand from the receiver.

FIGS. 10A–10C show an alternate method for preventing an unauthorized person from gaining access to a PAN computer by interposing himself between a PAN transmitter and a PAN receiver antennae 18 that is associated with the computer. Three successive positions are shown of an authorized person 90 bearing a PAN transmitter 92 reaching toward a PAN receiver antennae 18 mounted on, e.g., an ATM machine. FIG. 11 shows a plot of signal amplitude and phase detected at receiver antennae 18 as a function of distance between the person's hand 1 18 and receive antennae 18, as shown in FIG. 10. The letters A, B, and C on the graph in FIG. 11, correspond to FIGS. 10A, 10B, and 10C.

Specifically, as recognized by the present invention, by placing the PAN transmitter 92 on the front part of the person 90, for example in a shirt pocket or around the neck, as with an identification badge, a direct signal path 110 is provided between the PAN transmitter 92 and receiver antennae 18 when the person 90 is in the position shown in FIG. 10A. The body of the person 90 provides the return path for the electric signal, illustrated by electric field lines 111, to the earth 120. The resulting relatively strong amplitude and positive phase is shown at location A in FIG. 11. As the person 90 moves their arm 112 towards the receiver antennae 18 to induce field lines 114, as shown in FIG. 10B, the amplitude of the receiver signal dips toward a minimum, as indicated in dashed lines and the phase of the signal changes, as indicated in solid lines in FIG. 11, at location B.

As shown in FIG. 10C, when the hand 118 touches the PAN receiver antennae 18, a low impedance connection is made between the PAN transmitter 92 and the PAN receiver antennae 18. The PAN transmitter 92 communicates indirectly to the receiver antennae 18. The earth 120 provides the return signal path via the electric field 116. This indirection gives rise to the phase change, indicated on location C on the graph in FIG. 11. The signal strength is shown to be relatively smaller than location A since the electric field 116 must make its way around the arm 112.

An analog detector, such as an electrical circuit like the receiver 88 shown in FIGS. 8 and 9, or a digital detector, such as the computer 20 shown in FIG. 1, can detect the predetermined characteristic of phase and amplitude and thereby validate that the person reaching toward the receive electrode bears a PAN transmitter. If no such characteristic is determined, however, the detector can output a signal indicating that an unauthorized person has interposed herself between the transmitter and receiver.

While the particular SYSTEM AND METHOD FOR OPTIMIZING PERSONAL AREA NETWORK (PAN) ELECTROSTATIC COMMUNICATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited.

We claim:

1. A PAN communication system that communicates information via an electric field from a PAN transmitter to a PAN receiver, the receiver including at least one receive electrode disposed above a support, comprising:
   a driven shield disposed on the support between the receive electrode and the support; and
   an insulator layer sandwiched between the receive electrode and the driven shield, whereby
   the receive electrode is substantially shielded from the support.

2. The communication system of claim 1, further comprising an amplifier electrically connected to the driven shield and to the receiver, the driven shield being insulated from ground.

3. The communication system of claim 2, wherein the amplifier is a unity gain amplifier, such that the amplifier establishes a buffer.

4. The communication system of claim 1, further comprising:
   a computer associated with the receiver; and
   plural PAN receiver antennae associated with the receiver such that communication can be established between the PAN transmitter and the computer, the receive electrode establishing one of the receiver antennae.

5. The communication system of claim 4, wherein communication between the transmitter and computer is established using an electric field.

6. The communication system of claim 5, further comprising a data input device communicating with the computer, the receiver antennae being mounted on the data input device.

7. The communication system of claim 6, wherein the data input device is a keyboard.

8. The communication system of claim 5, wherein the system includes at least three receiver antennae.

9. The communication system of claim 7, wherein the keyboard defines left and right sides relative to a user of the keyboard, and at least one of the receiver antennae extends substantially from the left side to the right side.

10. The communication system of claim 4, wherein the receiver is associated with a signal, and the system further comprises:
    a computer program storage device readable by the computer; and
    a program means on the program storage device and including instructions executable by the computer for performing method steps for establishing a combination of the receiver antennae, the method steps comprising:
       decoupling a first one of the antennae from the receiver;
       determining whether the signal exhibits a predetermined change as a result of the decoupling of the first antenna; and
       recoupling the first antenna to the receiver if the signal does not exhibit the predetermined change.

11. The communication system of claim 10, wherein the method steps undertaken by the instructions include serially decoupling each antenna and determining whether the signal exhibits a predetermined change as a result of the decoupling of each antenna.

12. In a PAN communication system, a PAN transmitter including plural transmitter electrodes, wherein the electrodes include at least one driven electrode juxtaposed with at least one reference electrode, the driven electrode being insulated from the reference electrode.

13. The transmitter of claim 12, comprising at least first and second driven electrodes, each driven electrode being energized by a respective buffer circuit.

14. The transmitter of claim 12, further comprising at least one signal generator electrically connected to each buffer circuit.

15. A PAN communication system comprising:
    at least one PAN receiver including first receive electrode; and
    at least one second receive electrode positioned adjacent the first receive electrode, said first and second receive electrodes having substantially the same electric potential when a first person not bearing the PAN transmitter interacts with said first and second receive electrodes to prevent communication from the PAN transmitter to the receiver via the first person, said first and second receive electrodes having a substantially different electric potential when a second person bearing the PAN transmitter interacts with said first and second receive electrodes to permit communication from the PAN transmitter to the receiver.

16. The PAN communication system of claim 15, further comprising a guard electrode juxtaposed with and insulated from one or more receive electrodes, the guard electrode being insulated from ground.

17. The PAN communication system of claim 16, further comprising a guard driving follower amplifier electrically connected to a receive electrode and the guard electrode.

18. The PAN communication system of claim 15, further comprising a differential receive amplifier electrically connected to said first and second electrodes.

19. A PAN communication system, comprising:
    at least one PAN receiver including at least one receive electrode;
    at least one portable PAN transmitter; and
    at least a pair of differential receive electrodes for interaction by a person, the receive electrodes having substantially the same electric potential when a first person not bearing the PAN transmitter interacts with the receive electrodes to prevent communication from the PAN transmitter to the receiver via the first person, the receive electrodes having a substantially different electric potential when a second person bearing the PAN transmitter interacts with the receive electrodes to permit communication from the PAN transmitter to the receiver.

20. The PAN communication system of claim 19, further comprising a guard electrode juxtaposed with and insulated from at least one receive electrode, the guard electrode being insulated from ground.

21. The PAN communication system of claim 20, further comprising a guard driving follower amplifier electrically connected to the guard electrode and the receive electrode.

22. The PAN communication system of claim 19, further comprising a differential receive amplifier electrically connected to the receive electrodes.

23. The communication system of claim 19, wherein the PAN transmitter includes plural transmitter electrodes.

24. The communication system of claim 23, wherein the transmitter electrodes include a plurality of driven electrodes juxtaposed with at least one reference electrode, the driven electrodes being insulated from the reference electrode.

25. The communication system of claim 24, wherein the transmitter comprises at least first and second driven electrodes, each driven electrode being energized by a respective buffer circuit.

26. The communication system of claim 25, further comprising at least one signal generator electrically connected to each buffer circuit.

27. An electrostatic communication system for communicating data between a portable transmitter and a computer system nearby the transmitter using an electric field affected by a person bearing the transmitter, comprising:
a receiver including plural receiver antennae associated with the computer system such that at least some electric field lines from the person are not shunted away from at least one of the receiver antennae when the person moves an arm toward the computer system, the receiver being associated with a signal;
logic means for decoupling a first one of the antennae from the receiver;
logic means for determining whether the signal exhibits a predetermined change as a result of the decoupling of the first antenna; and
logic means for recoupling the first antenna to the receiver if the signal does not exhibit the predetermined change.

28. The communication system of claim 27, wherein the computer system includes a computer and a data entry device for inputting data into the computer, the receiver antennae being mounted on the data entry device.

29. The communication system of claim 28, wherein the communication system includes at least three receiver antennae.

30. The communication system of claim 29, wherein the keyboard defines left and right sides relative to a user of the keyboard, and at least one of the receiver antennae extends substantially from the left side to the right side.

31. The communication system of claim 27, further comprising logic means for serially decoupling each antenna and determining whether the signal exhibits a predetermined change as a result of the decoupling of each antenna.

32. The communication system of claim 27, wherein the receiver antennae are receive electrodes disposed above a support, and the system further comprises:
a driven shield disposed on the support between at least a first one of the receive electrodes and the support; and
an insulator sandwiched between the first one of the receive electrodes and the driven shield, whereby the first one of the receive electrodes is substantially shielded from the support.

33. A near field communication system, comprising:
a receive electrode disposed above a surface; and
a driven shield disposed between the receive electrode and the surface to shield the receive electrode from the surface.

34. The communication system of claim 33, further comprising:
a receiver electrically connected to the receive electrode; and
a drive amplifier electrically connected to the receiver and the driven shield, the driven shield being insulated from the receive electrode.

35. A communication system, comprising:
an electric field transmitter including at least first and second driven electrodes both facing at least one reference electrode.

36. The communication system of claim 35, wherein each driven electrode is energized by a respective buffer circuit.

37. The communication system of claim 36, further comprising at least one signal generator electrically connected to each buffer circuit.

38. A communication system, comprising:
a computer;
an electric field receiver associated with the computer;
at least one receive electrode electrically connected to the receiver;
a portable electric field transmitter bearable by a first person for communicating with the computer via the receiver; and
means for preventing communication between the transmitter and receiver when a second person not bearing an electric field transmitter is interposed between the transmitter and the receiver.

39. The system of claim 38, wherein the means for preventing includes at least a pair of receive electrodes for interaction by a person, said receive electrodes having substantially the same electric potential when a second person not bearing the PAN transmitter interacts with said receive electrodes to prevent communication from the PAN transmitter to the receiver via the second person, said receive electrodes having a substantially different electric potential when a first person bearing the PAN transmitter interacts with said receive electrodes to permit communication from the PAN transmitter to the receiver.

40. The communication system of claim 39, further comprising a guard electrode juxtaposed with and insulated from at least one receive electrode, the guard electrode being insulated from ground.

41. The communication system of claim 40, further comprising a guard driving follower amplifier electrically connected to the guard electrode and said receive electrode.

42. The communication system of claim 41, further comprising a differential receive amplifier electrically connected to said pair of receive electrodes.

43. The communication system of claim 38, so wherein the receiver is associated with a signal, and wherein means for preventing includes a detector for detecting a predetermined characteristic in the signal when a first person bearing the transmitter moves a limb toward the receive electrode.

44. The communication system of claim 43, wherein the predetermined characteristic is at least one of: an amplitude minimum, and a change of phase.

45. A PAN communication system, comprising:

at least one PAN receiver; and at least one portable PAN transmitter comprising at least first and second driven electrodes, each driven electrode being energized by a respective buffer circuit.

46. A personal area network (PAN) communication system, comprising:

a PAN transmitter;

a computer;

more than one PAN receiver antenna on a keyboard associated with the computer, the keyboard defining left and right sides relative to a user of the keyboard, at least one of the receiver antennae being elongated and extending substantially across the keyboard from substantially the left side to substantially the right side such that communication can be established between the PAN transmitter and the computer.

47. The communication system of claim 46, wherein the system includes at least three receiver antennae.

48. A personal area network (PAN) communication system, comprising:

a PAN transmitter;

a computer;

more than one PAN receiver antenna associated with the computer such that communication can be established between the PAN transmitter and the computer, wherein the receiver antennae are associated with a receiver, the receiver being associated with a signal;

logic means for decoupling a first one of the antennae from the receiver;

logic means for determining whether the signal exhibits a predetermined change as a result of the decoupling of the first antenna; and logic means for recoupling the first antenna to the receiver if the signal does not exhibit the predetermined change.

49. The communication system of claim 48, further comprising logic means for serially decoupling each antenna and determining whether the signal exhibits a predetermined change as a result of the decoupling of each antenna.

50. A personal area network (PAN) communication system, comprising:

a PAN transmitter;

a computer;

more than one PAN receiver antenna associated with the computer such that communication can be established between the PAN transmitter and the computer, wherein the receiver antennae are receive electrodes disposed above a support and associated with at least one receiver;

a driven shield disposed on the support between at least a first one of the receive electrodes and the support, the driven shield being insulated from ground; and an insulator layer sandwiched between the first one of the receive electrodes and the driven shield, whereby the first one of the receive electrodes is substantially shielded from the support.

51. The communication system of claim 50, further comprising a unity gain amplifier electrically connected to the driven shield and to the receiver.

* * * * *